(12) United States Patent
Park et al.

(10) Patent No.: US 7,258,494 B2
(45) Date of Patent: Aug. 21, 2007

(54) OPTICAL MODULE FOR MULTI-WAVELENGTH

(75) Inventors: Joong-Wan Park, Suwon-si (KR); Mun-Kue Park, Suwon-si (KR); Jae-Myung Baek, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 112 days.

(21) Appl. No.: 11/122,729

(22) Filed: May 5, 2005

(65) Prior Publication Data

US 2006/0140547 A1    Jun. 29, 2006

(30) Foreign Application Priority Data

Dec. 28, 2004  (KR)  ...................... 10-2004-0113737

(51) Int. Cl.
*G02B 6/36* (2006.01)

(52) U.S. Cl. .......................................... 385/89; 385/47

(58) Field of Classification Search ...................... None
See application file for complete search history.

(56) References Cited

U.S. PATENT DOCUMENTS

| | | | | | |
|---|---|---|---|---|---|
| 5,408,559 | A | * | 4/1995 | Takahashi et al. | ............ 385/89 |
| 5,552,918 | A | * | 9/1996 | Krug et al. | .................. 398/139 |
| 5,796,899 | A | * | 8/1998 | Butrie et al. | ................... 385/92 |
| 6,493,121 | B1 | * | 12/2002 | Althaus | ....................... 398/135 |
| 6,498,875 | B1 | * | 12/2002 | Jiang et al. | .................... 385/33 |
| 2002/0028049 | A1 | * | 3/2002 | Bartur et al. | ................. 385/92 |
| 2004/0141698 | A1 | * | 7/2004 | Chen | ............................ 385/93 |
| 2005/0180755 | A1 | * | 8/2005 | Masahiko | .................... 398/135 |
| 2005/0185899 | A1 | * | 8/2005 | Lo et al. | ....................... 385/92 |

* cited by examiner

*Primary Examiner*—Rodney Bovernick
*Assistant Examiner*—Mike Stahl
(74) *Attorney, Agent, or Firm*—Cha & Reiter, LLC

(57) ABSTRACT

An optical module includes a module body on which at least one photo diode is mounted, a filter holder inserted into the module body, and a thin film filter mounted on the filter holder in order to guide optical signals towards photo diodes in such a manner that optical signals with corresponding wavelengths are received in the photo diodes. The filter holder, on which the thin film filters are mounted, is fabricated separately from the module body and houses active elements, such as the laser diode and photo diodes. The filter holder is inserted into the module body thereafter, so the optical module is easily fabricated at a low cost and in a simple manner.

17 Claims, 5 Drawing Sheets ously, the present invention has been made to solve# OPTICAL MODULE FOR MULTI-WAVELENGTH

CLAIM OF PRIORITY

This application claims priority to an application entitled "Optical Module For Multi-Wavelength," filed with the Korean Intellectual Property Office on Dec. 28, 2004 and assigned Serial No. 2004-113737, the entire contents of which are incorporated herein by reference.

BACKGROUND OF THE INVENTION

1. Field of the Invention

The present invention relates to an optical communication element. More particularly, the present invention relates to an optical module for housing a plurality of active elements, such as a laser diode and a photo diode.

2. Description of the Related Art

In general, an optical module includes an electric circuit device, such as a printed circuit board, on which a laser diode, a photo diode, etc., are mounted. The optical module outputs an electric signal by converting a radio frequency signal into an optical signal or vice versa. As the information industry has progressed rapidly, a great amount of information is transmitted/received through an optical network at a high transmission rate. Accordingly, it is necessary to provide an optical module capable of transmitting/receiving mass data at a high transmission rate.

FIG. 1 illustrates a conventional optical module 10 for a multi-wavelength which includes a laser diode 11 and at least one pair of photo diodes 12.

In operation, the laser diode 11 receives an RF signal and outputs an optical signal by converting the RF signal into the optical signal. The photo diodes 12 receive the optical signal and covert the optical signal into the RF signal. The optical signal outputted from the laser diode 11 and the optical signal received in the photo diodes 12 have the same optical path. Thus, the optical path of the optical signals to be received in the photo diodes 12 must be shifted in such a manner that the optical signals having wavelengths corresponding to the characteristics of the photo diodes 12 can be received in the photo diodes 12. The optical module 10 transmits the optical signals along an optical axis of the laser diode 11 and is equipped with the thin film filters 14 and 15 corresponding to the number of the photo diodes 12. After the optical path of the optical signals has been shifted by means of the thin film filters 14 and 15, the optical signals are incident into the photo diodes 12 by passing through predetermined lenses 16 and 17. The lenses 16 and 17 are aligned in the optical path of the optical signals between the thin film filters 14 and 15 and the photo diodes 12.

FIG. 2 is a sectional view of another conventional optical module 100 for a multi-wavelength. As shown, the conventional optical module 100 includes a module body 101 in which a thin film filter 111 and a lens 113 are installed. A laser diode 102 is installed at one end of the module body 101 and photo diodes 103 and 104 are mounted at both side ends of the module body 101. In addition, an optical fiber 115 is coupled with the other end of the module body 101.

The optical module 100 having the above structure is integrally formed through an electric discharge machining process in order to form a mounting position of the thin film filter 111. However, since the structure of the conventional optical module 100 is complicated, it is difficult to fabricate the optical module 100 in mass production.

FIG. 3 shows yet another conventional optical module 200. As shown, the optical module 200 includes a module body 210 in which a laser diode 202, photo diodes 203 and 204, and an optical fiber 215 are installed therein. Further, thin film filters 211 are inserted into the module body 201.

However, the optical module 200 having the above structure uses a plurality of components, thus increasing the manufacturing cost. In addition, since the thin film filters 211 are inserted into the module body 201, a tolerance between parts of the optical module 200 must be considered, so that precision of the optical module 200 may be degraded.

SUMMARY OF THE INVENTION

Accordingly, the present invention has been made to solve the above-mentioned problems occurring in the prior art and provides additional advantages, by providing an optical module that can be fabricated easily for mass production.

Another aspect is that the present invention may be realized in a simple, reliable, and inexpensive implementation.

In one embodiment, there is provided an optical module for a multi-wavelength which includes: a module body on which at least one photo diode is mounted; a filter holder inserted into the module body; and a thin film filter mounted on the filter holder in order to guide optical signals towards photo diodes in such a manner that optical signals having wavelengths corresponding to the photo diodes can be received in the photo diodes.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
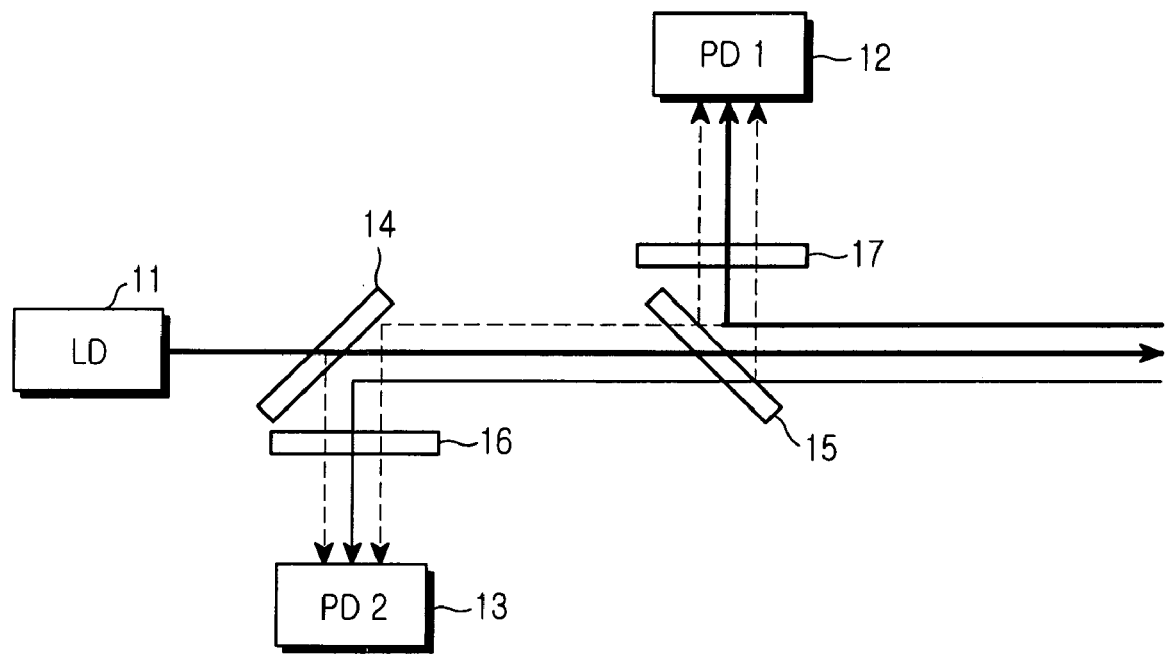
FIG. 1 is a view illustrating a conventional optical module for a multi-wavelength.
Figure 2:
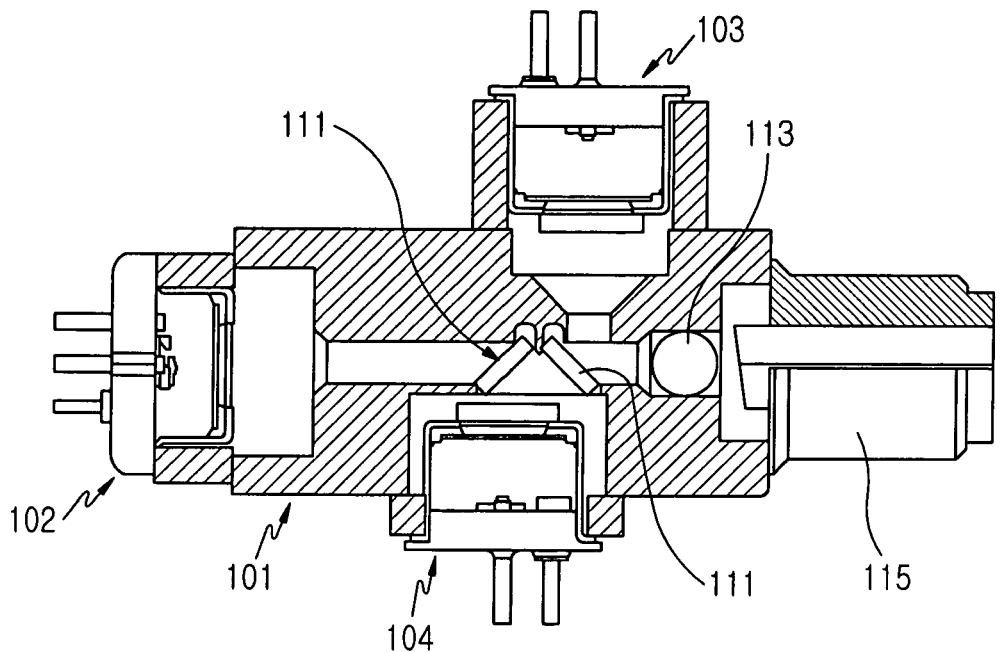
FIG. 2 is a sectional view of another conventional optical module for a multi-wavelength.
Figure 3:
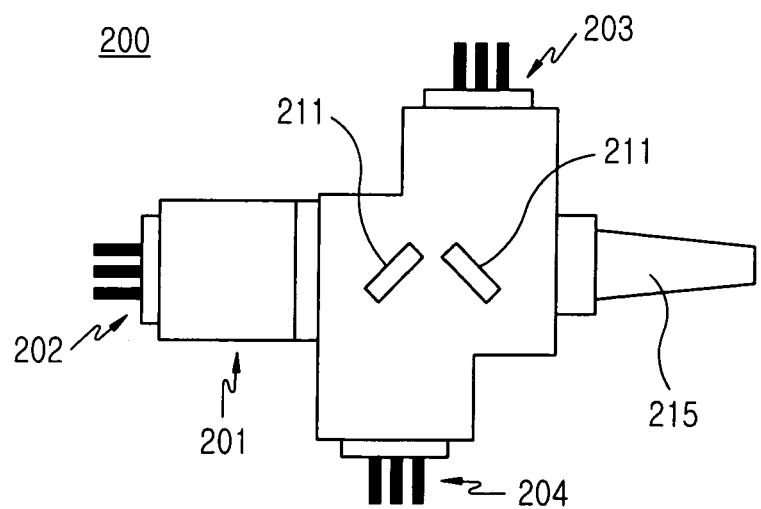
FIG. 3 illustrates another conventional optical module for a multi-wavelength.
Figure 4:
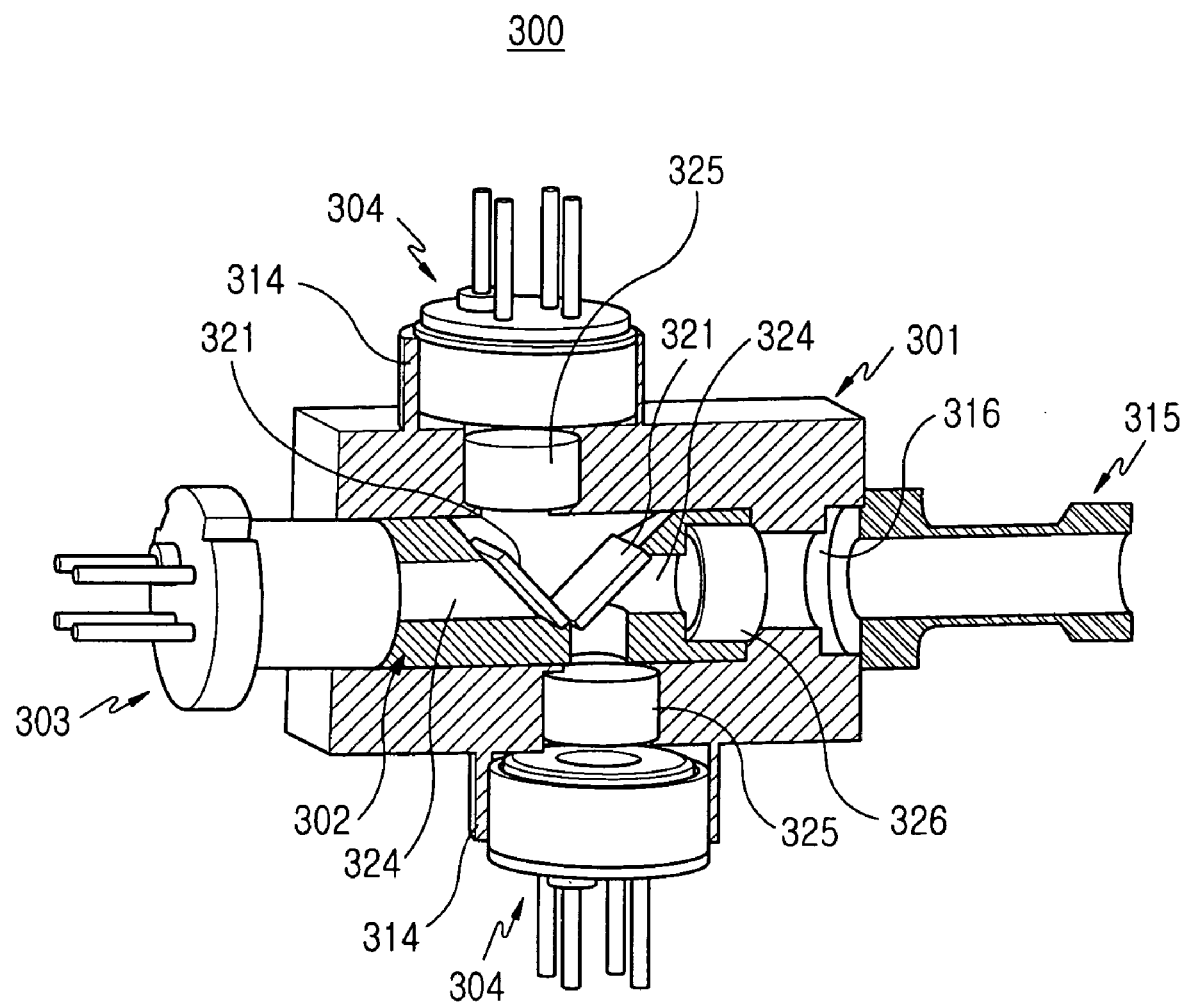
FIG. 4 is a sectional view illustrating a structure of an optical module for a multi-wavelength according to one embodiment of the present invention.

FIG. 4 is a perspective view illustrating the structure of an optical module for a multi-wavelength according to one embodiment of the present invention. As shown, the optical module 300 according to the present invention includes a module body 301, in which a laser diode 303, photo diodes 304 and an optical fiber 315 are installed thereon, and a filter holder 302 inserted into the module 301.

Figure 5:
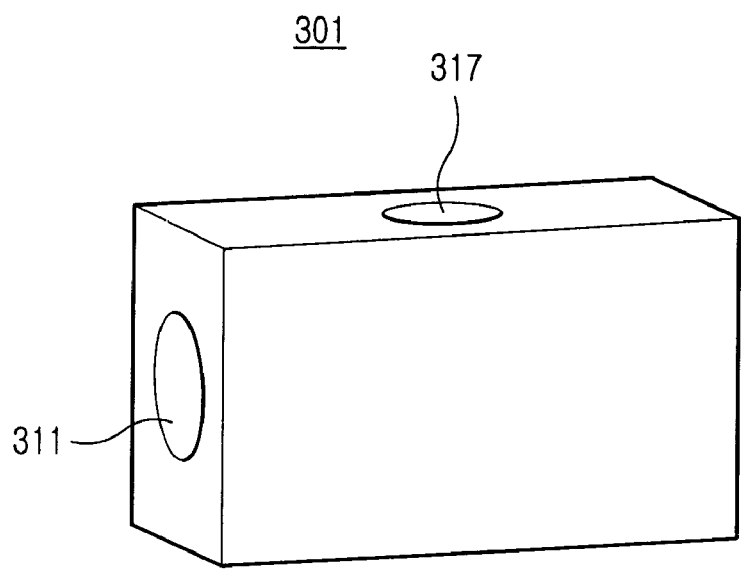
FIG. 5 is a perspective view illustrating a module body of an optical module shown in FIG. 4.
Figure 6:
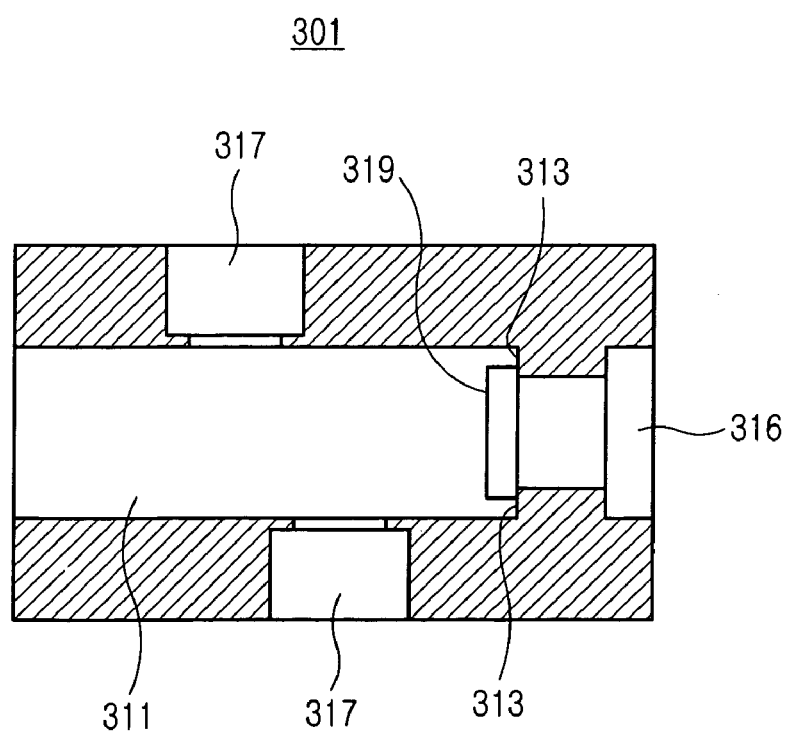
FIG. 6 is a sectional view illustrating a module body shown in FIG. 5.

Referring to FIGS. 5 and 6, the module body 301 has a receiving hole 311 extending lengthwise from one end of the module body 301 and a stepped portion 313 formed at another end of the receiving hole 311. A connection hole 316 connected to an optical fiber is formed at the other end of the module body 301. The connection hole 316 is aligned in line with the receiving hole 311. Coupling holes 317 are formed at upper and lower portions of the module body 301, respectively. A lens is installed in each of the coupling holes 317, and the photo diodes 304 are coupled into the coupling holes 317. An alignment key 319 is formed at the end of the receiving hole 311. The alignment key 319 protrudes from the stepped portion 313 so as to provide a criterion when aligning the filter holder 302.

Figure 7:
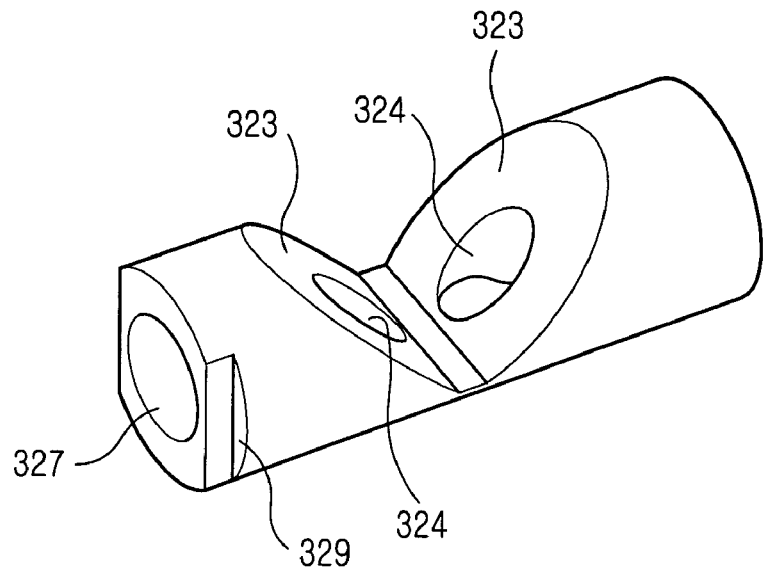
FIG. 7 is a perspective view illustrating a filter holder of an optical module shown in FIG. 4.
Figure 8:
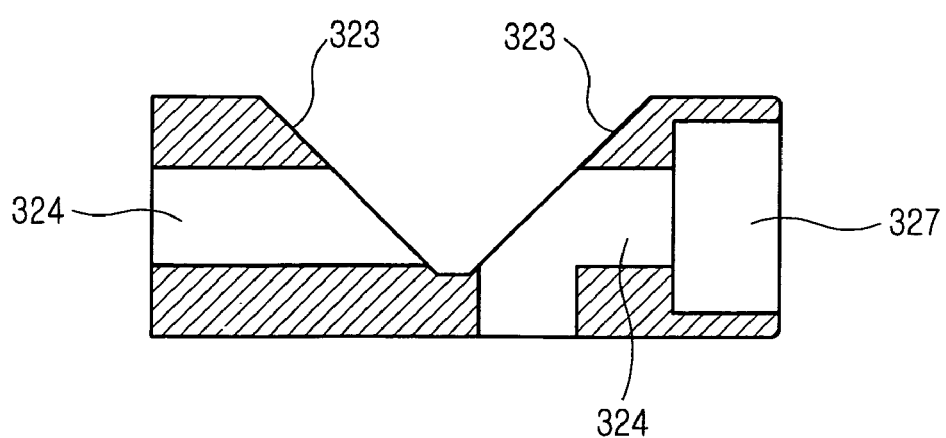
FIG. 8 is a sectional view illustrating a filter holder shown in FIG. 7.

Referring to FIGS. 7 and 8, the filter holder 302 is formed at an inner portion thereof with a perforation hole 324 formed lengthwise along the filter holder 302. The perforation hole 324 is aligned in an optical axis of the laser diode 303 in order to provide the optical path with optical signals outputted from the laser diode 303 and optical signals received through the optical fiber 315.

A lens hole 327 is formed at one end of the perforation hole 324 so as to receive a lens 326 therein. The lens 326 is aligned in the optical axis of the optical signal outputted from the laser diode 303.

Since the end of the filter holder 302 is blocked by the stepped portion 313 of the receiving hole 311, the filter bolder 302 is prevented from being further inserted into the receiving hole 311. Thus, a key slot 329 formed at the end of the filter holder 302 is engaged with the alignment key 319. That is, the alignment key 319 formed at die end of the receiving hole 311 is engaged with the key slot 329 of the filter holder 302, so that the filter holder 302 can be securely fixed at a predetermined position in the module body 301.

The filter holder 302 is formed at a predetermined portion thereof with at least one inclined surface 323. Preferably, the number of the inclined surfaces 323 corresponds to the number of photo diodes 304 installed in the module body 301. According to the preferred embodiment of the present invention, two photo diodes 304 are installed in the module body 301, so two thin filters 321 are installed in the filter holder 302 and two inclined surfaces 323 are formed in the filter holder 302.

The inclined surface 323 is formed by cutting an outer peripheral surface of the filter holder 302 at a predetermined angle. If a pair of inclined surfaces 323 is formed in the filter holder 302 as shown in FIGS. 7 and 8, the inclined surfaces 323 may be spaced apart from each other by a predetermined distance. Accordingly, bottom ends of the inclined surfaces 323 are aligned adjacent to each other.

In addition, the inclination angle of the inclined surface 323 may vary depending on the wavelength of the optical signal passing through the perforation hole 324 and the relative position between the photo diodes 304 and the inclined surfaces 323. For illustrative purposes, the inclination angle of the inclined surface 323 is about 45° with respect to a longitudinal axis of the perforation hole 324. The optical axis of the photo diodes 304 is vertical to the longitudinal axis of the perforation hole 324.

When the filter holder 302 has been inserted into the module body 302, the inclined surfaces 323 face the coupling holes 317. Accordingly, the thin film filters 321 mounted on the inclined surfaces 323 may shift the optical path of the optical signals having wavelengths corresponding to the photo diodes 304 towards the coupling holes 317 when the optical signals are received in the thin film filters 321 through the perforation hole 324. After the optical path of the optical signals has been shifted by means of the thin film filters 321, the optical signals are incident into the photo diodes 304 through a lens 325 installed in the coupling hole 317.

At this time, the alignment key 319 is engaged with the key slot 329 so that the thin film filters 321 are aligned in such a mariner that the optical signals having the optical path shifted by means of the thin film filters 321 are incident into the photo diodes 304.

Referring back to FIG. 4, the filter holder 302 is provided at the end thereof with the lens 326 and at the inclined surfaces 323 thereof with the thin film filters 321. In this state, the filter holder 302 is inserted into die receiving hole 311. As mentioned above, the fixing position of the filter holder 302 in the receiving hole 311 is determined according to the engagement relationship between the alignment key 319 and the key slot 329.

After the filter holder 302 has been inserted into the module body 301, the laser diode 303, the photo diodes 304 and the optical fiber 315 are coupled with the module body 301.

The laser diode 303 is coupled with one end of the module body 301 and aligned adjacent to the filter holder 302. As mentioned above, the optical axis of the laser diode 303 passes through the perforation hole 324, so that the optical signal outputted from the laser diode 303 is directed towards the optical fiber 315 through the perforation hole 324.

In order to securely fix the laser diode 303 and photo diodes 304 to the module body 301, a rib 314 surrounding the photo diodes 304 can be additionally installed in the module body 301.

According to the optical module 300 of the present invention, the thin film filters 321 are mounted on the fiber holder 302 is inserted into the module body 301. In addition, the fixing position of the filters holder 302 with respect to the module body 301 is determined according to the engagement relationship between the alignment key 319 and the key slot 327.

As described above, the filter holder, on which the thin film filters are mounted, is fabricated separately from the module body, on which active elements, such as the laser diode and photo diodes, are mounted according to the teachings of the present invention. Thereafter, the filter holder is inserted into the module body, so that the optical module can be easily fabricated. That is, the conventional optical module is fabricated through the electric discharge machining to form a space in the optical module for the installation of a thin film filter therein, so it is difficult to realize a mass production of an optical module. In addition, the number of parts for the optical module according to the present invention can be reduced as compared with that of the conventional optical module as the thin film filter is inserted into the module body in a way similar to a loading way of a cassette tape, for example. Furthermore, the alignment key and the key slot are formed in order to align the filter holder with respect to the module body, so the manufacturing cost for the optical module can be reduced and an alignment precision between the thin film filter and the photo diodes can be improved.

While the invention has been shown and described with reference to certain preferred embodiments thereof, it will be understood by those skilled in the art that various changes in form and details may be made therein without departing from the spirit and scope of the invention as defined by the appended claims. For instance, in order to determine a coupling direction of the filter holder 302 with respect to the module body 301, a guide rib extending lengthwise from an outer peripheral surface of the filter holder 302 can be engaged with a guide slot formed at an inner peripheral surface of the module body 301. In addition, it is also possible to press-fit an alignment pin into a pin hole formed at the end of the filter holder 302 from the end of the module body 301.

What is claimed is:

1. An optical module for a multi-wavelength, comprising:
    a module body on which at least one photo diode is mounted;
    a filter holder disposed in the module body;
    at least one thin film filter, the thin film filter being mounted on the filter holder and being configured to guide optical signals towards the photo diode in such a manner that optical signals having wavelengths corresponding to the photo diode can be received therein;
    a receiving opening formed along the module body for receiving the filter holder therein, the receiving opening having a stepped portion formed at an inner end wall thereof; and
    an alignment key formed at the stepped portion and a key slot formed at one end of the filter holder corresponding to the alignment key.

2. The optical module as claimed in claim 1, wherein more than one photo diodes are installed on the module body.

3. The optical module as claimed in claim 1, wherein an optical signal is incident on the optical module along the module body.

4. The optical module as claimed in claim 1, wherein the thin film filter is slantingly aligned with respect to a longitudinal axis of the module body at a predetermined angle.

5. The optical module as claimed in claim 1, further comprising a perforation opening extending lengthwise along the filter holder, the perforation opening being configured to provide an optical path for an optical signal and at least one inclined surface formed by slantingly cutting an outer peripheral surface of the filter holder beyond the perforation opening at a predetermined angle, wherein the thin film filter is mounted on one of the inclined surfaces.

6. The optical module as claimed in claim 5, further comprising a lens aligned in the optical path of the optical signal between the thin film filter and the photo diode.

7. The optical module as claimed in claim 6, wherein the lens is installed in the module body.

8. The optical module as claimed in claim 1, further comprising a pair of inclined surfaces formed on the filter holder at a predetermined angle such that the bottom ends of the inclined surfaces are adjacent to each other, wherein the thin film filter is mounted on one inclined surface.

9. The optical module as claimed in claim 8, wherein a pair of photo diodes are mounted on an outer peripheral surface of the module body so as to receive optical signals from the thin film filters.

10. The optical module as claimed in claim 1, further comprising a laser diode being installed at one end of the module body, being adjacent to one end of the filter holder, and being aligned to the filter holder.

11. The optical module as claimed in claim 10, further comprising a lens aligned in an optical axis of the laser diode and installed at the other end of the filter holder.

12. The optical module as claimed in claim 1, wherein a position of the filter holder with respect to the module body is determined according to an engagement relationship between the alignment key and the key slot.

13. The optical module as claimed in claim 1, wherein the alignment key engages with the key slot so that the thin film filter is aligned in such a manner that an optical signal having an optical path shifted by the thin film filter is incident into the photo diode.

14. A method for fabricating an optical module, the method comprising the steps of:
    providing a module body on which at least one photo diode is mounted, the module body having a receiving hole and having a stepped portion formed on an inner wall therein;
    providing an alignment key on the stepped portion;
    providing a filter holder on which at least one film filter is mounted to guide optical signals towards the photo diode in such a manner that optical signals having wavelengths corresponding to the photo diode can be received therein, the filter holder having a key slot that is formed on one end and that corresponds to the alignment key; and
    inserting the filter holder into the receiving hole of the module body.

15. The method of claim 14, further comprising providing a lens aligned in an optical path of the optical signals between the thin film filter and the photo diode.

16. The method of claim 14, wherein the alignment key engages with the key slot so that the thin film filter is aligned in such a manner that an optical signal having an optical path shifted by the thin film filter is incident into the photo diode.

17. The method of claim 14, further comprising the steps of:
    providing a pair of inclined surfaces on the filter holder at a predetermined angle such that bottom ends of the inclined surfaces are adjacent to each other, and
    mounting the thin film filter on one inclined surface.

* * * * *